(No Model.)
D. E. CONNER.
ELECTRIC CONDUCTOR FOR UNDERGROUND CONDUITS.
No. 518,939.  Patented May 1, 1894.
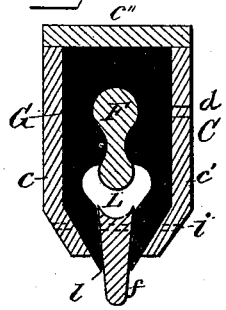
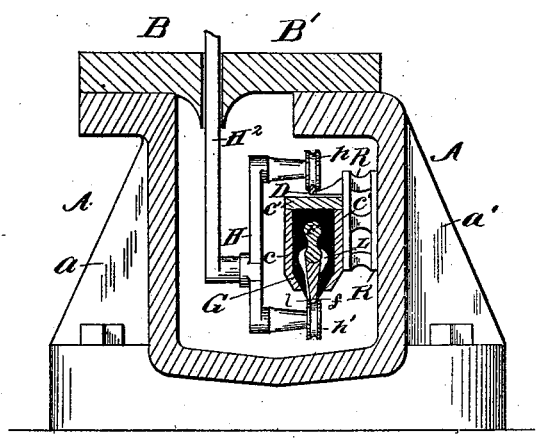
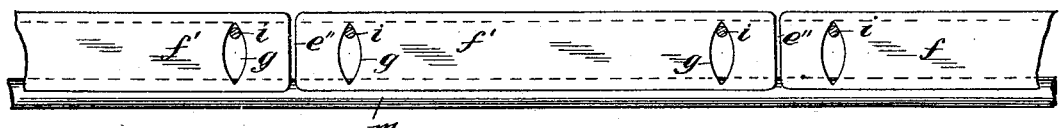
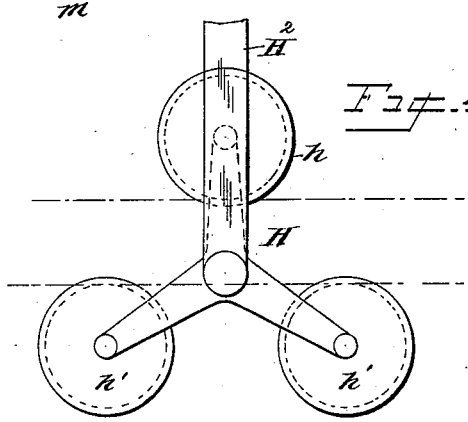
Attest:
Arthur A. Erb.
M. A. M. Fraysser.
Inventor:
Daniel Ellis Conner
By E. B. Clark
Atty

UNITED STATES PATENT OFFICE.

DANIEL ELLIS CONNER, OF COVINGTON, KENTUCKY, ASSIGNOR OF ONE-HALF TO JAMES WILLIAM GALLUP, OF CLEVELAND, OHIO.

ELECTRIC CONDUCTOR FOR UNDERGROUND CONDUITS.

SPECIFICATION forming part of Letters Patent No. 518,939, dated May 1, 1894.

Application filed January 23, 1893. Serial No. 459,321. (No model.)

*To all whom it may concern:*

Be it known that I, DANIEL ELLIS CONNER, a citizen of the United States, residing at Covington, in the county of Kenton and State of Kentucky, have invented certain new and useful Improvements in Electric Cables for Underground Conduits; and I do hereby declare the following to be a full, clear, and exact description of the invention, such as will enable others skilled in the art to which it appertains to make and use the same.

This invention relates to an electric sub cable or conductor arranged in an underground conduit for the transmission of electric power for propelling cars, &c., the conduit being of that class having a slot through which projects the stem or blade of a trolley which is carried by the moving car, and by means of which a current is carried from my specially constructed and arranged conductor and contact chain or connected contact pieces, upward to the motor on a car.

The object of my invention is to provide improved means for conducting the electric current from the generating station and supplying it to the motor or motors, or other devices at a distance therefrom; and to these ends my invention consists in the various features of construction and arrangement of parts hereinafter more particularly pointed out.

I will now particularly describe my invention with reference to the accompanying drawings, in which—

Figure 1 represents a transverse section, on enlarged scale, of my stringer containing the double conductor embedded in insulating material, and the gravity contact chain. Fig. 2 represents a side elevation of my gravity contact chain. Fig. 3 represents a side elevation of my contact chain, showing the links or pieces connected by a wire. Fig. 4 represents a side elevation, on enlarged scale, of my trolley. Fig. 5 represents a transverse section of a conduit containing my improved electrical conducting devices and trolley, suitably arranged for conducting electricity to a motor on a car.

In carrying out my invention, I construct a suitable stringer in the form of an inverted box or trough C, composed of metallic side walls $c$, $c'$, and the cover $c''$; or the stringer may be cast with side walls and top in one piece. The side walls $c$, $c'$, are preferably inclined downward and inward, as shown in the enlarged sectional view, Fig. 1, to aid in holding the insulating material in place. This stringer is nearly filled with insulating material G, within which is partially embedded the live double wire or bar F. The insulating material contains a longitudinal opening L, and a downward slot, $l$, through its lower edge. The lower half of the double wire F, projects into the passage L, in the insulating material, so that it may be readily subjected to the linked contact pieces $f$, constituting the contact chain E. The longitudinal slot, $l$, opening downward in the insulating material G, is made slightly flaring in cross section, as shown in Fig. 1; that is, the walls of the slot diverge from the lower edge toward the longitudinal passage L, for the purpose of receiving and retaining the contact chain E. The links, $f$, of the contact chain are made wedge-shaped in cross section; that is thicker at their top edges and tapering to their lower edges, and are adapted to closely fit the slot $l$, in the insulating material G of the stringer, so as to make a tight joint, and thereby keep out moisture. They are adapted to be raised by the trolley wheels into contact with the live wire F, and then to fall by gravity, so as to fill and close the slot. The links of the chain may be about one-half an inch in width and sufficiently thick to fit into and close the slot, and they are constructed at the ends with notches $e$, and tongues $e'$, loosely fitting one into the other, as shown in Fig. 2. They are also provided with oval transverse apertures $g$, through which are passed pins $i$, which also pass through the insulating material or side walls of the stringer and serve to support the links $f$, and hold them against lengthwise or other displacement. The apertures $g$ and pins $i$, also permit the links to be raised into contact with the live wire and then fall by gravity, so as to close the slot $l$. As shown in Fig. 2, the links $f$, are not absolutely connected one with the other, though the tongues, $e'$, loosely fit into the notches $e$, and make contact while the links hang upon the transverse pins $i$. The top and thick edges of the links may be grooved, as shown in Fig. 1, for making better contact with the live wire F, and the links may be made of suitable lengths to permit of curves and turns in the live wire if required.

In practice, I construct a suitable box or conduit A, having braces $a$, and supported upon the cross ties of the road way. My stringer C, containing the live wire and the contact chain, is preferably secured by means of brackets R to one side or wall of the conduit A, as shown in Fig. 5, so as to be at one side of the conduit and away from the longitudinal slot in the top or cover B, B'.

Immediately above the stringer C, I firmly secure to the bracket R, a guide rail D, for sustaining one wheel of the trolley H. The trolley H, is composed of a frame having three arms to which are pivotally connected the upper wheel $h$, and the two lower wheels $h'$, $h'$, which are preferably set at the points of an equilateral triangle. The two lower wheels $h'$, $h'$, bear up against the links $f$, of the contact chain, E, so as to force a link or two at one time up against the live double wire F. The trolley stem or blade $H^2$ passes through the slot of the conduit and connects with the car in the usual manner. The upper wheel $h$, of the trolley will in practice be suitably insulated and an insulated conducting wire will also in practice pass along or through the blade $H^2$, but the particular construction and arrangement of such an insulating material are not here shown, as it forms no part of my invention.

Fig. 3 shows a contact chain which is more particularly adapted for long and straight courses of road. It is provided at its bottom edge with a continuous round wire, $m$, for the trolley wheel to bear against, and its upper portion is formed of sections $f'$, corresponding in shape with the links $f$, heretofore described. In case a continuous bar or rod is used in the first instance for the upper half of this form of chain, such rod or bar is cut at suitable intervals, as indicated at $e''$, down to the continuous bottom wire, $m$, as shown in Fig. 3, so as to make it more flexible and respond more readily to the pressure of the trolley. This construction of contact wire or chain prevents the too sudden starting or stopping of the car. The wire $m$ may be cast with or welded to the sections $f$ or $f'$. The continuous wire $m$, may also be secured in the same way to the sections or contact pieces $f$, shown in Fig. 2, and in connection with such links forms part of my invention.

By means of my stringer or casing, containing the insulated conductor and closed at the top, I effectively protect the conductor from water which might pass down through the top slot of the conduit, and by means of my gravity contact pieces E, constituting the contact chain, I avoid the use of springs and similar devices which have heretofore been used for raising the contact wire or other devices away from the live conductor, and thus much simplify the construction of operation of an underground electrical conductor. The springs heretofore used were liable to get out of order and fail to act. The links or pieces of my contact chain fall by gravity after being raised by the trolley, and fill the downwardly extending slot, so as to keep out moisture, and thereby preserve the live wire in good active condition.

At suitable intervals, the walls of the stringer or casing C, may be provided with apertures, $d$, which also extend through the insulating material, G, for making side connections with the live wire whenever necessary. Portions of the live wire may thus be connected with lateral branches, whenever it is desired to take out a section of the stringer or live wire for repairs.

The method of operating my trolley in connection with the contact chain and the live wire inclosed in the insulating material within the stringer C, will be understood from the above description by those skilled in the art.

Having described my invention, what I claim, and desire to secure by Letters Patent, is—

1. In an electric conduit, a live wire or conductor, in combination with the contact pieces or links loosely supported below said conductor in a slot in insulating material and exposed below to direct contact of a trolley, substantially as described.

2. In an electric conduit, a live wire or conductor partly embedded in insulating material having a downwardly extending slot below the conductor and contact pieces or links loosely supported in said slot, substantially as described.

3. A stringer containing an insulated live wire or conductor having a downwardly extending slot in its lower edge and a contact chain composed of links loosely supported in said slot, substantially as described.

4. In combination with a suitably insulated live wire or conductor, a gravity contact chain composed of contact pieces or links continuously in contact, one with another forming a continuous conductor and loosely supported below said live wire, and adapted to be raised by the trolley and to fall by gravity out of contact, substantially as described.

5. A stringer or casing, containing an insulated live wire or conductor, and having a downwardly extended slot with walls converging toward the lower edge, said slot containing wedge-shaped contact pieces or links loosely supported therein below the conductor, substantially as described.

6. A stringer or casing containing insulating material in which is partially embedded the live wire or conductor and having a downwardly extending slot below said conductor, containing loosely supported contact pieces or links adapted to be raised against the conductor by the trolley and to fall by gravity away from said conductor, substantially as described.

7. In combination with a live wire or conductor and slotted insulating material below the same, contact pieces or links, having transverse openings and transverse pins passing through said openings for loosely supporting said pieces or links in the slot, substantially as described.

8. In combination with a conductor, a contact chain composed of links having their ends provided with notches and tongues fitting one into the other, and means for loosely supporting said links below the conductor, substantially as described.

9. In combination with a conductor a contact chain composed of pieces or links having a continuous wire or rod at their lower edges and means for loosely supporting said links below the conductor, substantially as described.

10. A double live wire or conductor partially embedded and supported in insulating material, in combination with the yielding gravity contact chain supported below the same, in the slot of the insulating material and adapted to be raised into contact with the said live wire by a trolley and to fall out of contact by gravity, substantially as described.

11. In combination with a conduit, a bracket applied to the side wall thereof, a stringer supported by said bracket and containing a conductor and gravity contact chain, a guide rail above said stringer and a trolley having a wheel resting on the guide rail and another wheel bearing upon said contact chain, substantially as described.

In testimony whereof I affix my signature in presence of two witnesses.

DANIEL ELLIS CONNER.

Witnesses:
THOS. WOODS,
WM. JONES.